United States Patent [19]

Shibata

[11] Patent Number: 5,383,127
[45] Date of Patent: Jan. 17, 1995

[54] ON-VEHICLE POSITION COMPUTING APPARATUS

[75] Inventor: Akihito Shibata, Yokohama, Japan

[73] Assignee: Matsushita Electric Industrial Co., Ltd., Osaka, Japan

[21] Appl. No.: 943,525

[22] Filed: Sep. 11, 1992

[30] Foreign Application Priority Data

Sep. 19, 1991 [JP] Japan .................................. 3-239213

[51] Int. Cl.⁶ .............................................. G06F 15/50
[52] U.S. Cl. .................................. 364/449; 364/443; 364/454; 342/451; 342/457; 340/988
[58] Field of Search ............... 364/443, 449, 454, 455, 364/459; 73/178 R; 342/357, 358, 450, 451, 457; 340/988, 995

[56] References Cited

U.S. PATENT DOCUMENTS

| 4,731,613 | 3/1988 | Endo et al. ............................ 364/450 |
| 4,899,285 | 2/1990 | Nakayama et al. ................... 342/357 |
| 4,903,212 | 2/1990 | Yokouchi et al. .................... 364/449 |
| 5,087,919 | 2/1992 | Odagawa et al. ..................... 342/457 |
| 5,155,688 | 10/1992 | Tanaka et al. ........................ 364/454 |
| 5,220,509 | 6/1993 | Takemura et al. .................... 364/454 |
| 5,272,483 | 12/1993 | Kato ..................................... 342/457 |

FOREIGN PATENT DOCUMENTS

| 0393935 | 10/1990 | European Pat. Off. . |
| 153180 | 3/1989 | Japan . |
| 2212713 | 8/1990 | Japan . |
| 2126040 | 3/1984 | United Kingdom . |

OTHER PUBLICATIONS

Yamada et al "GPS Navigator," Japanese Radio Technical Bulletin No. 24, 1986.

Edward J. Krakiwsky, "A Kalman Filter for Integrating Dead Reckoning, Map Matching and GPS Positioning", IEEE Plans '88 Position Location and Navigation Symposium Record, Kissemee, Fla. USA, 29 Nov. 2–Dec. 1988, pp. 39–46.

Primary Examiner—Gary Chin
Attorney, Agent, or Firm—Stevens, Davis, Miller & Mosher

[57] ABSTRACT

High degree of accuracy of the position of a vehicle can be ensured by maintaining the continuity of the running path of the vehicle and by correcting the vehicle position to a vehicle position measured by a GPS navigation system when a positional deviation occurs due to sensor errors. Specifically, the vehicle positions are estimated in accordance with signals from sensors for detecting behaviors of the vehicle, and then the vehicle position is shifted onto a designated road having a feature coincident with that of the running path of the vehicle based upon data of the estimated vehicle positions. Further, the vehicle position is corrected to a position measured by use of a GPS receiver only when the cumulative value of distances of the positional shifts made by a number of cycles in past or in a predetermined running distance range exceeds a predetermined threshold value.

11 Claims, 4 Drawing Sheets

FIG. 1a
PRIOR ART
FIG. 1b
PRIOR ART
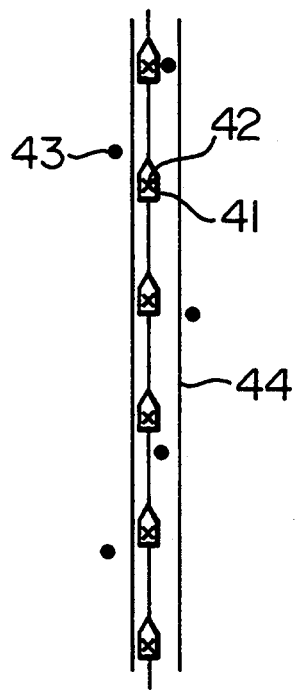
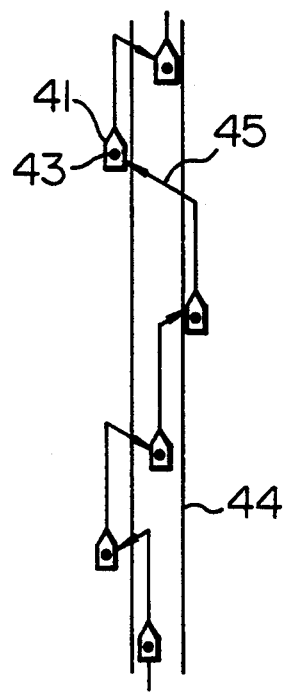

6,383,127

ON-VEHICLE POSITION COMPUTING APPARATUS

BACKGROUND OF THE INVENTION

The present invention relates to an on-vehicle position computing apparatus in a navigation system for indicating a position of a vehicle, an azimuth thereof and data of a map therearound, and the like.

DESCRIPTION OF THE RELATED ART

Heretofore, an on-vehicle position computing apparatus of this kind has estimated positions of a running vehicle in accordance with signals from a speed sensor and an angular velocity sensor so as to search road data in a predetermined area among map data around the estimated positions for a road having a feature coincident with that of a running path based on data of the estimated positions, as a designated road, and accordingly, the position of the vehicle on the map is shifted to a position on the designated road. Further, a GPS (global positioning system) receiver for obtaining an absolute vehicle position has been used, and accordingly, in the case of enabling the vehicle position to be measured in accordance with data from the GPS receiver, the vehicle position has been corrected onto the measured position on the map.

However, in the above-mentioned vehicle position computing apparatus, irrespective of the fact that estimated positions of the vehicle can be computed from signals from the speed sensor and the angular velocity sensor with a high degree of accuracy in a short running distance range, the position of the vehicle has been corrected onto a position which can be computed in accordance with data from the GPS receiver even though the running distance range is short. Thus, if the degree of accuracy for a vehicle position computed in accordance with data from the GPS receiver becomes lower than that of a degree of positional accuracy required by the navigation system or a degree of accuracy for map data due to change-over of artificial satellites used for computing multipasses and measuring a position, the degree of accuracy of the vehicle position would become lower.

In FIGS. 1a and 1b which show the above-mentioned condition, there are shown a vehicle 41, estimated positions 42 obtained in accordance with signals from the speed sensor and the angular velocity sensor, vehicle positions 43 (indicated by dot marks) measured by use of the GPS receiver, and a road 44. As shown in FIG. 1a, in the above-mentioned system, the vehicle positions are shifted to the positions 43 measured by use of the GPS receiver, as shown in FIG. 1a even though the estimated vehicle positions 42 computed in accordance with signals from the speed sensor and the angular velocity sensor have a high degree of accuracy so that the running path of the vehicle 41 can be precisely displayed on the road 44 with the use of the estimated vehicle positions 42, and accordingly, if the deviation between each of the positions measured by use of the GPS receiver and the associated one of the estimated vehicle positions is large, a zigzag-like running path is displayed, and a positional interlacing 45 occurs.

With occurrence of such a positional interlacing 45, the following problems are inevitably raised. That is, an apparent large error is exhibited on an enlarged scale map, deteriorating the attractiveness of the display, and the driver feels a sense of incongruity and a sense of uneasiness. Further, the running path of the vehicle fails to maintain its continuity, and accordingly, continuous data of a road required for ensuring the positional accuracy cannot be used.

SUMMARY OF THE INVENTION

The present invention is devised in order to solve the above-mentioned problems, and accordingly, one object of the present invention is to provide an on-vehicle position computing apparatus which is excellent in maintaining continuity of the running path of a vehicle and in ensuring a high degree of positional accuracy for the vehicle in order to avoid displaying an unattractive display, a sense of incongruity and a sense of uneasiness to the driver of the vehicle, which are caused by positional interlacing, and in order to use the continuity of road data.

To this end, according to the present invention, there is provided an on-vehicle position computing apparatus comprising a means for computing estimated positions of a vehicle in accordance with signals from a speed sensor and an angular velocity sensor, a means for locating a designated road by comparing a running path of the vehicle given by the estimated vehicle positions obtained by the estimated position computing means with road data, a means for shifting the position of the vehicle onto the designated road located by the locating means, a means for correcting the position of the vehicle to a position measured by use of a GPS receiver only when an cumulative value of distances of shift made by the position shifting means by a predetermined number of correction cycles or within a predetermined running distance range becomes greater than a threshold value.

In the above-mentioned arrangement according to the present invention, when the position of the vehicle is corrected to a designated road having a feature coincident with that of the running path of the vehicle computed in accordance with signals from the speed sensor and the angular velocity sensor, it is determined that the possibility of running of the vehicle on the road is high if the cumulative value of corrected distances given by the shift of positions is less than the threshold value, and accordingly, the position measured by use of the GPS receiver is disregarded so as to maintain the continuity of the running path. Meanwhile, it is determined that the possibility of running of the vehicle on the road is low if the cumulative value is greater than the threshold value, and accordingly, the vehicle position is corrected to a position measured by use of the GPS receiver.

Explanation will be made hereinbelow in detail in accordance with the accompanying drawings in which:

BRIEF DESCRIPTION OF THE INVENTION

FIGS. 1a and 1b are views explaining the operation of a position computing apparatus of the related art in accordance with estimated vehicle positions computed thereby;

FIG. 4a is a graph showing variation in the cumulative value of distances of positional shift, corresponding to the positions computed by the apparatus, as shown in FIG. 3a.

DESCRIPTION OF THE PREFERRED EMBODIMENTS

Figure 2:
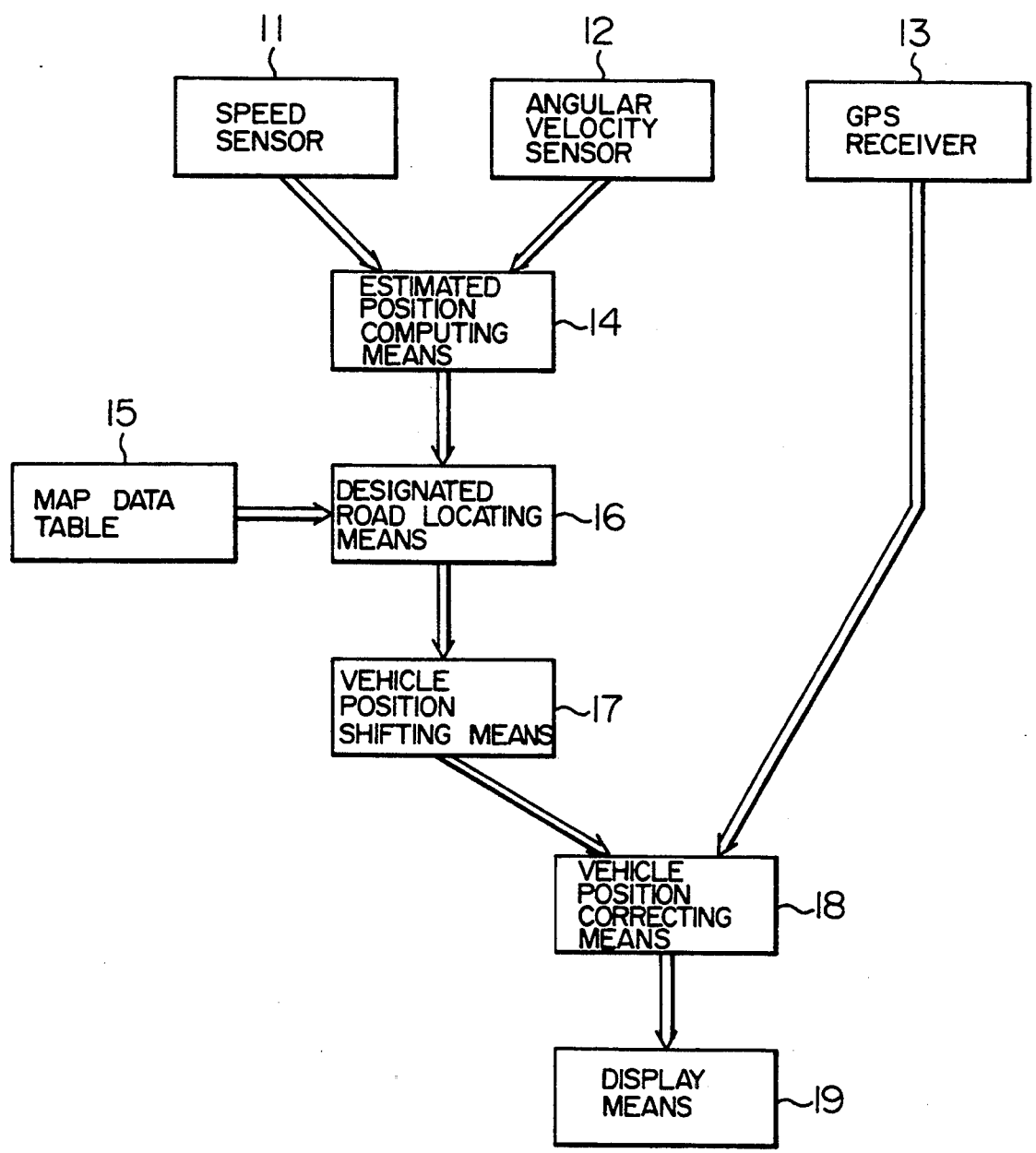
FIG. 2 is a schematic block diagram illustrating an on-vehicle position computing apparatus in an embodiment of the present invention.

Referring to FIG. 2 which shows the arrangement of an on-vehicle position computing apparatus in one embodiment of the present invention, there are shown a speed sensor 11 for detecting a running speed of a vehicle on which the on-vehicle position computing apparatus is installed, an angular velocity sensor 12 for detecting an angular velocity of the running vehicle, a GPS receiver 13 for receiving electric waves from a plurality of GPS artificial satellites, which is explained in detail in Japanese Radio Technical Bulletin, No. 24, 1986, pages 16 to 23, an estimated positions computing means 14 for computing the present vehicle position in accordance with signals transmitted from the speed sensor 11 and the angular velocity sensor 12 (a position computed by this means 14 is used as an estimated vehicle position), a map data table 15 including several road data for correcting positions, which is stored in a CD-ROM or the like, a designated road locating means 16 for comparing a running path of the vehicle, based upon data of the estimated vehicle positions, with road data on the map data table 15 so as to locate data of a road on which the vehicle possibly runs at present, a vehicle position shifting means 17 for shifting the vehicle position onto a designated road which has been located by the designated road locating means 16, a vehicle position correcting means 18 for correcting the vehicle position to a position measured by use of the GPS receiver 13 (which position will be denoted hereinbelow as "GPS position") only when the cumulative value of distances with which the vehicle position has been shifted by the vehicle position shifting means 17 in a predetermined number of cycles exceeds a threshold value, a display means 19 such as a CRT, an LCD or the like, for displaying thereon both road map around a road on which the vehicle runs at present, and the position of the vehicle itself, on which the positions set by the vehicle position shifting means 17 and the vehicle position correcting means 18 are also shown.

Next, explanation will be made of the operation of the above-mentioned embodiment with reference to FIGS. 2 and 3. In the above-mentioned embodiment, the estimated position computing means 14 computes at first estimated vehicle positions from signals transmitted from the speed sensor 11 and the angular velocity sensor 12. Then, the designated road locating means 16 locates a road having a feature coincident with that of a running path of the vehicle based upon data of the estimated vehicle positions, among road data in a predetermined area around the estimated vehicle positions, as a designated road data. Further, the vehicle position shifting means 17 shifts the vehicle position onto the designated road.

Figure 3A:
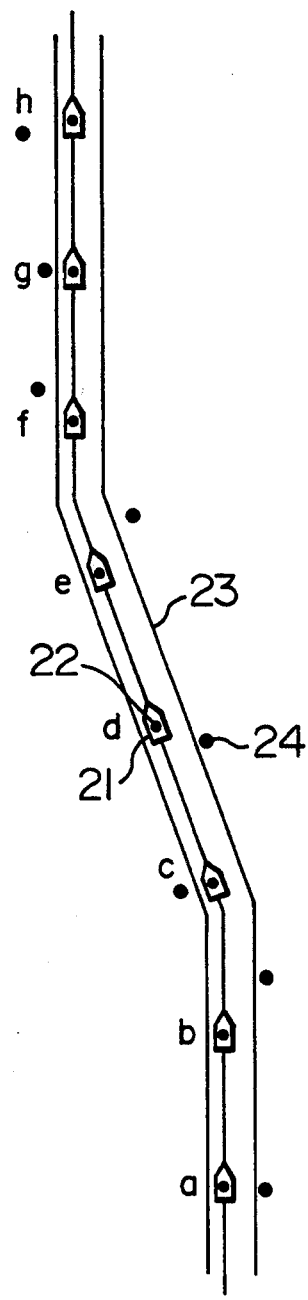
FIG. 3a is a view showing an example in which the vehicle positions computed by the apparatus shown in FIG. 2 are set on a road on which the vehicle actually runs.
Figure 3B:
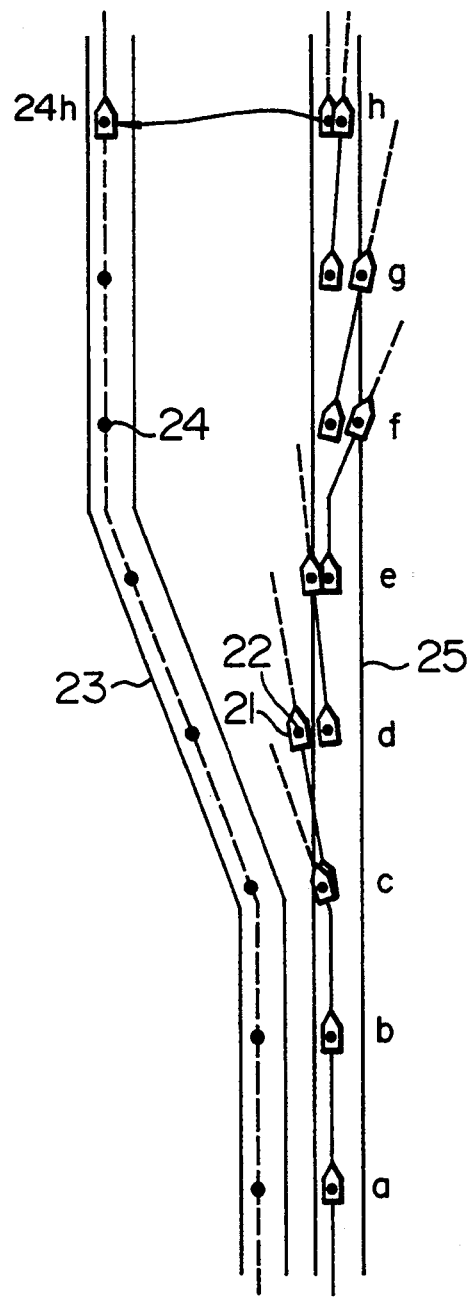
FIG. 3b is a view showing an example in which the vehicle positions computed by the apparatus are set on a road which is different from the road on which the vehicle actually runs.

FIGS. 3a and 3b show such conditions in which the vehicle positions are shifted onto a designated road.

Figure 4A:
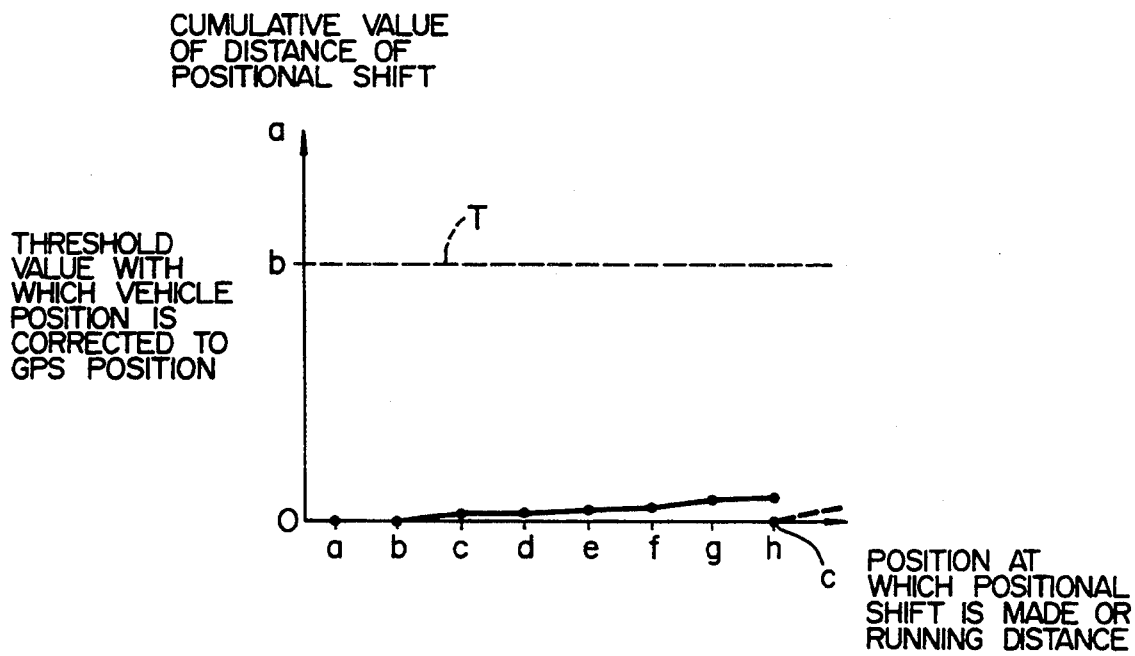

Referring to FIG. 3a which shows the estimated positions 22 of the vehicle 21 are shifted onto a road 23 on which the vehicle 21 runs actually while the GPS positions 24 are accompanied by errors which are outside of a tolerance given by a desired positional accuracy due to change-over of artificial satellites used for computing multipass and measuring positions. The vehicle position correcting means 18 computes the absolute cumulative value of distances with which the vehicle position has been shifted at eight positions a to h, and the cumulative value is then compared with the predetermined threshold value for each time of correction. This procedure is shown in FIG. 4a. In this example, since the estimated positions 22 coincide with those on a road on which the vehicle runs actually at present, the distances of shift are small, and accordingly, the absolute cumulative value of the distances of shift does not exceed the threshold value T even after the vehicle 21 comes to the position h. In this case, it is determined that the vehicle 21 possibly runs on the road 23, and accordingly, the vehicle position is not corrected to the GPS position 24 measured by use of the GPS receiver 13. Thus, it is possible to maintain the continuity of the running path of the vehicle.

Figure 4B:
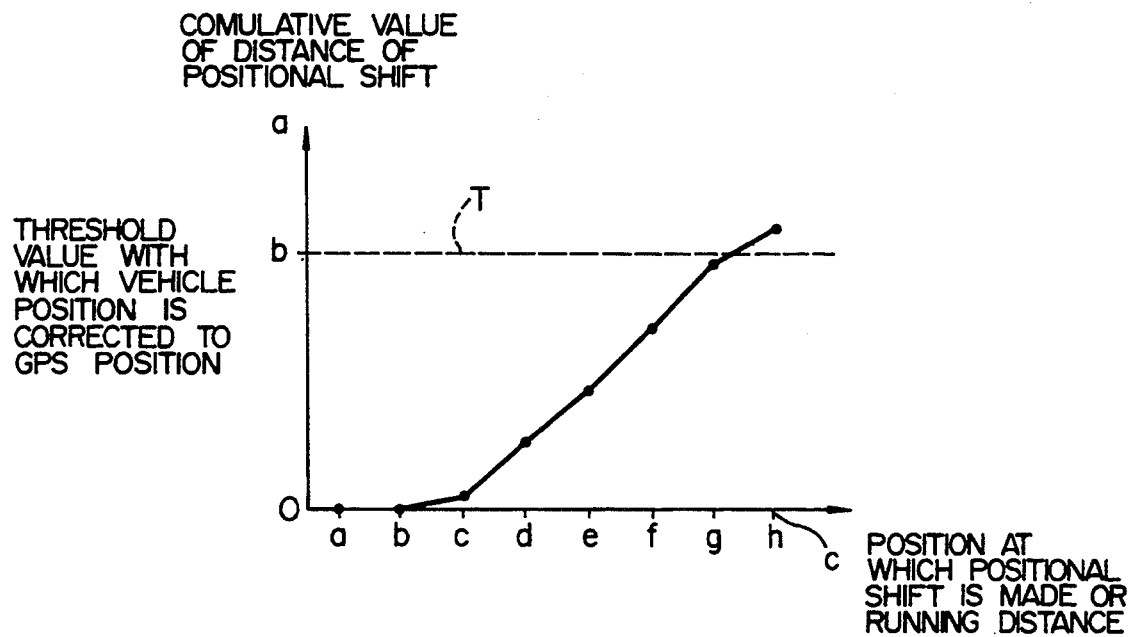
FIG. 4b is a graph showing variation in the cumulative value of distances of positional shift, corresponding to the positions computed by the apparatus, as shown in FIG. 3b.

FIG. 3b shows such an example that the vehicle 21 runs actually on a road 23, but the estimated positions thereof are set erroneously on a road 25 adjacent to the road 23. In this example, the azimuth of the vehicle successively approaches the azimuth of the road 25 each time when the vehicle position is shifted. Specifically, the estimated position computing means 14 computes a new estimated position 22 at the point e (refer to FIG. 3b) from signals transmitted from the speed sensor 11 and the angular velocity sensor 12, and a vehicle position at the point d, on the map displayed on the display means 19. Since the new estimated position 22 is not on the designated road 25, the shifting means 17 shifts the vehicle position onto the road as show at the point (e) on the map. Similarly in this case, the distances of shift made by the vehicle position shifting means 17 in eight times in the past at the positions a to h are accumulated so as to obtain the absolute cumulative value thereof which is then compared with the threshold value each time when the position is corrected. FIG. 4b shows this procedure. In this case, the estimated positions do not exist on the road on which the vehicle runs actually at present, and accordingly, the distances of shift are large so that the absolute cumulative value exceeds greatly the threshold value T. At the position h where the cumulative value exceeds the threshold value T, the vehicle position correcting means 18 determines that the possibility of the running of the vehicle on the road 25 is low, and accordingly, corrects the vehicle position onto the GPS position measured by use of the GPS receiver 13, that is, it is shifted onto the GPS position 24h on the road 23.

Thus, according to the above-mentioned embodiment, it is possible to aim at easily matching the pattern of the running path of the vehicle with a road shape in dependence upon whether the absolute cumulative value of the distances of the shift exceeds the threshold value T each time when the vehicle position is corrected, or not, and accordingly, it can be known whether or not the possibility of running of the vehicle on a road onto which the vehicle position is shifted at present is high. Accordingly, this GPS position is disregarded to maintain the continuity of the running path of the vehicle if the possibility of shifting the vehicle position onto a road on which the vehicle runs actually at present is high, and accordingly, the continuity of road data necessary for maintaining the positional accuracy can be used. Further, if the possibility of shifting the vehicle position onto a road on which the vehicle runs actually at present is low, the vehicle position is corrected to the GPS position measured by use of the GPS receiver 13, thereby it is possible to cancel a positional deviation caused by accumulation of sensor errors. Thus, no sense of incongruity sense of uneasiness and unattractive display, which are caused by positional interlacing, are presented, and a high degree of accuracy for the vehicle position can be ensured.

Although the invention has been explained in the above-mentioned embodiment such that the cumulative value of distances of shift made by a number of cycles of positional shift in past is compared with the threshold value, the same results can be obtained with the use of positional shifts within a predetermined distance range, instead of those in a number of cycles.

Further, explanation has been made such that the speed sensor 11 and the angular velocity sensor 12 are used for transmitting signals to the estimated position computing means 14 so as to compute the present vehicle position, an azimuth sensor such as an earth-magnetic sensor, a gyro or the like, and a distance sensor or the like for detecting a running distance in accordance with a rotational speed of a wheel or the like can be used as sensors for detecting the behaviors of the vehicle without departing from the technical concept of the present invention.

What is claimed is:

1. An on-vehicle position detecting apparatus comprising:

means for estimating an estimated vehicle position of a vehicle in accordance with (i) signals from sensors for detecting behaviors of the vehicle and (ii) a present vehicle position on a map displayed on a display means;

means for designating a road by comparing a running path of the vehicle based upon said estimated vehicle position generated by said estimating means, with road data so as to locate a designated road on said displayed map;

means for shifting said estimated vehicle position to a displayed vehicle position on said designated road which has been located by said designating means; and means for computing a cumulative value of shifting distances made by said shifting means after a predetermined number of cycles of shifting, and for correcting the displayed vehicle position on said displayed map in accordance with data obtained externally of said vehicle when said cumulative value exceeds a predetermined threshold value.

2. An on-vehicle position computing apparatus as set forth in claim 1, wherein said sensors for detecting the behaviors of the vehicle comprise a speed sensor and an angular velocity sensor.

3. An on-vehicle position computing apparatus as set forth in claim 1, wherein said computing and correcting means corrects said displayed vehicle position in accordance with data transmitted from GPS artificial satellites.

4. An on-vehicle position computing apparatus as set forth in claim 1, wherein said sensors comprise an azimuth sensor and a distance sensor.

5. An on-vehicle position computing apparatus as set forth in claim 4, wherein said azimuth sensor comprises an earth-magnetic sensor.

6. An on-vehicle position computing apparatus as set forth in claim 4, wherein said azimuth sensor comprises a gyro.

7. An on-vehicle position computing apparatus as set forth in claim 3, wherein said sensors comprise an azimuth sensor and a distance sensor.

8. An on-vehicle position computing apparatus as set forth in claim 7, wherein said azimuth sensor comprises an earth-magnetic sensor.

9. An on-vehicle position computing apparatus as set forth in claim 7, wherein said azimuth sensor comprises a gyro.

10. An on-vehicle position computing apparatus as set forth in claim 1, further comprising means, operatively associated with said designating means, for storing said road data.

11. An on-vehicle position computing apparatus as set forth in claim 10, wherein said storing means comprises a CD-ROM.

* * * * *